United States Patent
Sekiya et al.

[11] Patent Number: 5,786,078
[45] Date of Patent: Jul. 28, 1998

[54] MAGNETO-OPTICAL RECORDING MEDIUM

[75] Inventors: Masahiko Sekiya; Kazuhiko Honjo; Atsushi Oyamatsu, all of Tokyo, Japan

[73] Assignee: Teijin Limited, Chuo-ku and Osaka, Japan

[21] Appl. No.: 368,241

[22] Filed: Jan. 3, 1995

Related U.S. Application Data

[63] Continuation of Ser. No. 781,109, Oct. 22, 1991, abandoned.

[30] Foreign Application Priority Data

Oct. 26, 1990 [JP] Japan ............... 2-287345

[51] Int. Cl.$^6$ ............... G11B 5/66; G11B 11/00
[52] U.S. Cl. ............... 428/332; 428/336; 428/694 DE; 428/694 NF; 428/694 XS; 428/694 RL; 428/694 MM; 428/694 PR; 428/694 EC; 428/64.3; 428/64.6; 428/900; 369/13; 369/272; 369/275.2; 369/275.5; 368/283; 368/286
[58] Field of Search ............... 428/694 DE, 694 NF, 428/694 XS, 694 RL, 694 MM, 694 PR, 694 EC, 332, 336, 900, 64.3, 64.6; 369/13, 272, 275.2, 275.5, 283, 286

[56] References Cited

U.S. PATENT DOCUMENTS

| | | | |
|---|---|---|---|
| 4,628,485 | 12/1986 | Tanaka et al. | 365/122 |
| 4,710,434 | 12/1987 | Sato et al. | 428/678 |
| 4,777,082 | 10/1988 | Ishizaki et al. | 428/216 |
| 4,882,718 | 11/1989 | Kryder et al. | 369/13 |
| 4,956,243 | 9/1990 | Miyake et al. | 428/694 NL |
| 5,058,099 | 10/1991 | Murakami et al. | 369/288 |
| 5,093,174 | 3/1992 | Suzuki et al. | 428/64 |

FOREIGN PATENT DOCUMENTS

| | | |
|---|---|---|
| 233034 | 2/1987 | European Pat. Off. |
| 258978 | 7/1987 | European Pat. Off. |
| 359114 | 9/1989 | European Pat. Off. |
| 406569 | 1/1991 | European Pat. Off. |
| 427982 | 5/1991 | European Pat. Off. |
| 52-109193 | 9/1977 | Japan |
| 73746 | 5/1983 | Japan |
| 73746 | 8/1983 | Japan |
| 227052 | 12/1984 | Japan |
| 293541 | 6/1986 | Japan |
| 62-283541 | 6/1986 | Japan |
| 62-293541 | 6/1986 | Japan |

OTHER PUBLICATIONS

F.E. Luborsky, et al. "Stability of Amorphous Transition Metal–Rare Earth Films For Magnet–Optic Recording", IEEE Transactions on Magnetics, vol.Mag–21, No. 5, Sep. 1985, pp.1618–1623.

M.Birukawa et al. "Repeat Reading Stability in Magnet-optical Media", Optical Memory Symposium '90, Jul. 11, pp.65–66.

Primary Examiner—Leszek Kiliman, PHD
Attorney, Agent, or Firm—Burgess, Ryan & Wayne

[57] ABSTRACT

A magneto-optical recording medium comprising a transparent substrate, a first dielectric layer on the substrate, a magneto-optical recording layer on the first dielectric layer and a metal reflecting layer on the magneto-optical recording layer, optically with a second dielecric layer between the magneto-optical recording layer, wherein the magneto-optical recording layer has a Curie temperature Tc of from 100° C. to 200° C. and a layer thickness of from 15 nm to 60 nm, the metal reflecting layer has a layer thickness of not less than 60 nm and a product $\lambda d$ of a thermal conductivity $\lambda$ by the layer thickness d of from 2.5 µW/K to 20 µW/K, and the following formula is satisfied: $Tc \leq -10 \times \lambda d + 300$. This magneto-optical recording medium has an improved stability under repeated recording and erasing, or continuous erasing, operations without a loss of a high recording sensitivity thereof.

21 Claims, 2 Drawing Sheets

1

MAGNETO-OPTICAL RECORDING MEDIUM

This application is a continuation of application Ser. No. 07/781,109, filed Oct. 22, 1991, now abandoned.

BACKGROUND OF THE INVENTION

1. Field of the Invention

The present invention relates to a magneto-optical recording medium in which information is recorded, reproduced and erased by a light such as a laser beam. More specifically, the present invention relates to a magneto-optical recording medium comprising a magneto-optical recording layer of a rare-earth and transition metal elements alloy or the like having a low Curie temperature, and a metal reflecting layer having a high thermal conductivity and/or a thick thickness and having a high recording sensitivity and in particular, an excellent resistance to repeated recording and erasing or to a continuous erasing.

2. Description of the Related Art

Magneto-optical recording mediums are in practical use as high density and high capacity information storage mediums, and particularly, various materials and systems have been proposed for information-erasable magneto-optical recording mediums having various fields of application.

A magneto-optical recording medium equivalent to a medium proposed in the prior art is a disc comprising a polycarbonate resin (PC) substrate having a thickness of 1.2 mm / a first transparent dielectric layer of AlSiN having a thickness of 110 nm / a magneto-optical recording layer of TbFeCo having a thickness of 22.5 nm / a second transparent dielectric layer of AlSiN having a thickness of 25 nm / a metal reflecting layer of AlTi having a thickness of 40 nm / and a protecting organic layer of an UV-curable resin having a thickness of 20 μm and a diameter of 130 mm.

The present inventors carried out the following evaluation of a magneto-optical recording medium having the same construction as that of the above magneto-optical recording medium: On a track having a diameter of 30 mm, a recording was made under the conditions of a disc rotation speed of 1800 r.p.m., a recording frequency of 3.7 MH$_z$ (pulse duty of 33%), an external magnetic field of 24 kA/m (300 Oe) and a recording laser power of 5.5 mW (the value at which the C/N reaches the maximum value), and then a laser beam having a power of 9 mW was continuously irradiated on the same track as above until a predetermined number of rotations was reached, to test the continuous erasing resistance. The above predetermined number of rotations was made $10^7$, as it is generally considered necessary to maintain a C/N of 45 dB or more after $10^7$ rotations. After the continuous erasing resistance test, the C/N was measured by conducting a recording under the same conditions as above, and a reproduction, and as a result, it was found that initial C/N was 48 dB, and that the C/N was reduced by 2 dB to 46 dB after $10^3$ rotations in a continuous erasing operation, and by 8 dB to 40 dB after $10^7$ rotations in a continuous erasing operation, and accordingly, the magneto-optical recording medium did not satisfy the criteria of a C/N of not less than 45 dB after $10^7$ rotations.

Namely, it was shown that the magneto-optical recording medium suffers a thermal deterioration of the magneto-optical recording layer when subjected to a repeated recording and erasing, because the medium is recorded and erased by heat from a laser beam. In particular, erasing is performed with a laser beam having a high power such that the temperature of the recording layer is considered to be raised to above 500° C., to thereby cause a remarkable deterioration of the recording layer when continuously erasing an identical track. Thus, for a rewritable magneto-optical recording medium, the problem of a deterioration of the performance of a magneto-optical recording medium due to a repeated recording and erasing, or a continuous erasing, of tracks must be solved.

Therefore, the object of the present invention is to provide a magneto-optical recording medium having a sufficient resistance to a repeated recording and erasing, or to a continuous erasing of tracks.

SUMMARY OF THE PRESENT INVENTION

The above object of the present invention is attained by a magneto-optical recording medium comprising a transparent substrate, a first dielectric layer on the substrate, a magneto-optical recording layer on the first dielectric layer, and a metal reflecting layer on the magneto-optical recording layer, optionally with a second dielectric layer between the magneto-optical recording layer and the metal reflecting layer, wherein said magneto-optical recording layer has a Curie temperature Tc of from 100° C. to 200° C. (100≦Tc≦200) and a layer thickness t of from 15 nm to 60 nm (15≦t≦60), the metal reflecting layer has a layer thickness d of not less than 60 nm, and a product λd of a thermal conductivity λ by the layer thickness d of from 2.5 μW/K to 20 μW/K (2.5≦λd≦20), whereby the following formula is satisfied: Tc≦−10×λd+300.

As described above, the present inventors tested the continuous erasing stability of a magneto-optical recording medium having a construction equivalent to that of a medium proposed in the prior art, and found that the C/N of the medium was remarkably reduced after $10^7$ rotations. The reason for this is considered to be that the recording layer is thermally deteriorated by an elevation of the temperature due to an irradiation of a laser during the continuous erasing stability test. Namely, a temperature of the amorphous rare-earth and transition metal alloy of the medium is raised to above 500° C. during the erasing, and therefore, a relaxation of the amorphous structure, a crystallization, an oxidization, and a nitrization, etc. of the magneto-optical recording layer occur, to thereby deteriorate the magneto-optical characteristics and lower the C/N of the medium.

Accordingly, the present inventors sought ways in which to prevent the temperature elevation of the recording layer, and found that an increase of the λd of a metal reflecting layer behind the recording layer, i.e., a selection of a material for the reflecting layer having a high thermal conductivity, and/or a thickening of the reflecting layer, is a most effective measure. Nevertheless, although this method allowed a prevention of the raising of the temperature of the recording layer, it caused a lowering of the sensitivity of the medium and required a high laser power for recording.

Accordingly, the present inventors then considered that a magneto-optical recording layer having a lower Curie temperature Tc would effectively obtain a necessary recording sensitivity with a recording laser power comparative to that for the magneto-optical recording medium proposed in the prior art, and thus evaluated a magneto-optical recording disc having the following construction: the disc comprised a PC substrate (1.2 mm) an AlSiN layer (110 nm) / a TbFeCo layer (22.5 nm) / an AlSiN layer (25 nm) / an AlTi layer (80 nm) / a protecting organic layer of UV-curable resin (20 μm), and had a diameter of 130 mm, in which the metal reflecting layer had a thickness double that of the medium proposed in the prior art, and the magneto-optical recording layer had a Curie temperature of about 190° C. A test of the continuous erasing stability as above, at an erasing power of 9 mW, was performed on this disc, and surprisingly, an excellent result of C/N≧45 dB after $10^7$ rotations was obtained. The C/N reached a maximum value at a laser power of 5.5 mW, and thus the recording sensitivity was comparable to that of the commercially available magneto-optical recording medium. This was considered to be because the thickness of the reflecting layer was increased from 40 nm to 80 nm, to thereby increase the λd corresponding to the heat sink characteristic of a spot of the recording layer heated by a laser, and remarkably prevent an elevation of the temperature of the recording layer.

Further, a magneto-optical recording medium having the following construction was made: a PC substrate (1.2 mm) / an AlSiN layer (110 nm) / a NdDyTbFeCo layer (22.5 nm) / an AlSiN layer (25 nm) / an AlTi layer (100 nm) / a protecting organic layer of an UV-curable resin (20 μm), and having a diameter of 130 mm, the metal reflecting layer having a thickness of 100 nm, more than double that of the medium proposed in the prior art, and the magneto-optical recording layer having a Curie temperature of about 150° C. A test of the continuous erasing stability as above, at an erasing power of 8.5 mW, was performed on this disc, and surprisingly, excellent results of a lowering of the C/N by less than 1 dB after $10^6$ rotations, and a lowering of the C/N by about 1.5 dB and a C/N of 45.5 dB after $10^7$ rotations were obtained. The C/N reached a maximum value at a laser power of 5.0 mW, and thus the recording sensitivity was superior to that of the magneto-optical recording medium proposed in the prior art. Such a highly sensitive medium is preferred for a high speed drive at 2400 rpm or 3600 rpm or more, as at a high rotation speed, a temperature elevation of the recording layer is smaller than that at a lower rotation speed, even at the same laser power, and this is preferable from the viewpoint of the stability of the medium. Therefore, a medium more sensitive than the present standard can be evaluated under milder conditions, i.e., at an erasing power of 8.5 mW or at a higher rotation speed. The present invention adopted the former condition, and mediums which reached a maximum C/N value at 5.0 mW were evaluated at an erasing power of 8.5 mW. Similarly, mediums which reached a maximum C/N value at 4.5 mW, as described later, were evaluated at an erasing power of 8.0 mW.

Note, although it is considered that a stability of a C/N≧45 dB after $10^7$ rotations is required, a stability of a lowering of the C/N of not more than 2 dB after $10^7$ rotations is more desirable.

DESCRIPTION OF THE PREFERRED EMBODIMENTS

Figure 1:
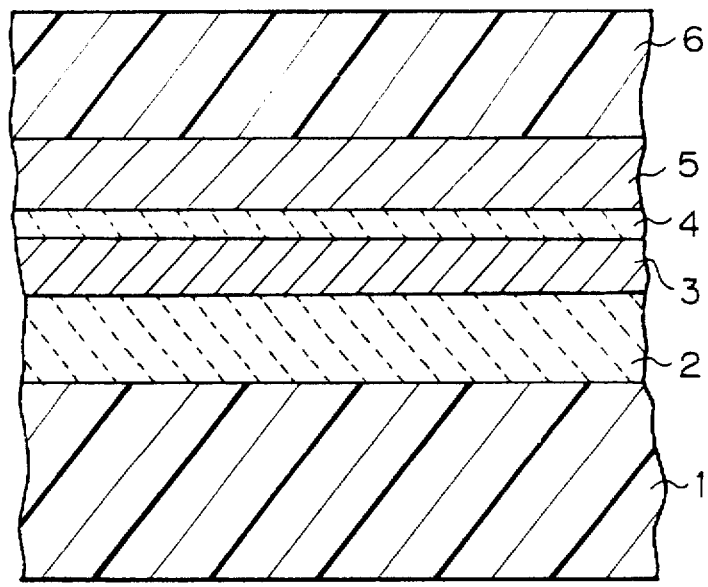
FIGS. 1 and 2 are sectional views of magneto-optical mediums made in Examples and Comparative examples.

To obtain the effects of the present invention, a continuous erasing stability, the thermal conductivity and/or thickness of the metal reflecting layer must be controlled to thereby obtain an appropriate λd. Basically, the λd is such that a temperature elevation of the recording layer is prevented, or the λd becomes larger. More specifically, if a metal reflecting layer is made of a material having a low thermal conductivity, the thickness of the metal reflecting layer should be thicker, but if a metal reflecting layer is made of a material having a high thermal conductivity, the thickness of the metal reflecting layer may be thinner. Note, the thickness d of the metal reflecting layer should be not less than 60 nm (d≧60), from the viewpoint of reflectance and stability.

The Curie temperature Tc of the magneto-optical recording layer should be lowered to obtain a higher sensitivity, because if the λd of the metal reflecting layer is made larger, the temperature elevation of the recording layer is suppressed.

The Curie temperature Tc of the magneto-optical recording layer should be selected in relation to the λd of the metal reflecting layer. According to experiments by the inventors, it was found that, when the λd of the metal reflecting layer is from 2.5 to 20 μW/K and Curie temperature Tc of the magneto-optical recording layer is not higher than 200° C., a required recording is possible with a laser power used for a magneto-optical drive unit, and a desired erasing stability during $10^7$ rotations is obtained.

When the medium construction and the thicknesses of the layers are the same, the recording sensitivity of the medium is mainly determined by a combination of Tc and λd. A combination of a low Tc and a small λd provides a highly sensitive medium which can be adopted to a high speed drive. Also, the recording sensitivity of a medium can be controlled by the thicknesses of the dielectric layers and the recording layer. When considering the requirements of the drive, such as a medium reflectance and C/N value, it is concluded that if Tc and λd are within the range of the present invention, magneto-optical recording mediums having a recording sensitivity and an erasing stability adapted to current and future magneto-optical recording drives can be obtained.

The Curie temperature Tc of the magneto-optical recording layer should be not lower than 100° C. (Tc≧100) preferably not lower than 110° C. (Tc≧110), since a high temperature and high humidity stability test of a magneto-optical recording medium is carried out at 80° C. and 85% RH. Also, the Curie temperature Tc of the magneto-optical recording layer should be not higher than 200° C. (Tc≦200), from the above-mentioned reason. Further not only for a C/N value of not lower than 45 dB after $10^7$ rotations but also a lesser lowering of the C/N value after $10^7$ rotations, the Curie temperature Tc of the magneto-optical recording layer is preferably not higher than 180° C. (Tc≦180), more preferably not higher than 160° C. (Tc≦160).

The thickness of magneto-optical recording layer should be in a range of 15 to 60 nm, to obtain the effects of the metal reflecting layer formed behind the magneto-optical recording layer and Kerr enhancement effects by a transparent dielectric layer. If the thickness of the magneto-optical recording layer is more than 60 nm, the effect of the reflecting layer is lowered and a C/N value is lowered.

On the other hand, when a Curie temperature Tc of the magneto-optical recording layer is lowered, the Kerr rotation angle $\theta_k$ of the magneto-optical recording layer, having a direct relationship with the C/N, is accordingly lowered, and thus the C/N of the medium is lowered. This problem may be solved by forming first and second magnetic layers, in this order from the substrate, as the magneto-optical recording layer, the first magnetic layer having a higher Curie temperature, a larger Kerr rotation angle and a smaller coercive force at a room temperature in comparison with those of the second magnetic layer, the second magnetic layer being made of a material for a magneto-optical recording layer having a Curie temperature required in the present invention. In this construction, during reproduction, since a laser light is incident on the first magnetic layer having a higher Curie temperature, i.e., a larger Kerr rotation angle, a high C/N is obtained. During recording, since the recording is first made on the second magnetic layer having a lower Curie temperature and then the recorded magnetic domain is copied to the first magnetic layer by an exchange coupling, the recording sensitivity is determined by the Curie temperature of the second magnetic layer. The total thickness of the first and second magnetic layers should be 15 to 60 nm, for the same reasons as above.

The relative thickness between the first and second magnetic layers is preferably $t_1 < t_2$, where $t_1$ denotes the thickness of the first magnetic layer and $t_2$ denotes the thickness of the second magnetic layer. If $t_1 \geq t_2$, i.e., $t_2$ is too thin, the magnetization of the first magnetic layer cannot be maintained even if the coercive force $Hc_2$ of the second magnetic layer is larger than the coercive force $Hc_1$ of the first magnetic layer, i.e., $Hc_2 > Hc_1$. As a result, a C/N value of the medium may be lower than that of a medium having a magneto-optical recording layer composed of a single magnetic layer. If the first magnetic layer is too thin, however, it is difficult to form a layer exhibiting good magnetic characteristics, and the formed layer is not stable. Therefore, the first magnetic layer preferably has a thickness of not less than 10 nm and thus $10 \leq t_1 < (t_1+t_2)/2$.

A magneto-optical recording medium of the present invention is characterized in that the Faraday effect is also utilized by passing a laser through the recording layer. Nevertheless, the present invention can be applied to an exchange coupled complex layer in which the construction of the first and second magnetic layers is reversed. Further, a layer for controlling the exchange coupling force may be inserted between the first and second magnetic layers.

The material of the magneto-optical recording layer may be any one that can be thermo-magnetically recorded and magneto-optically reproduced, more specifically materials that can form a magnetic layer having an easy magnetization axis perpendicular to the layer surface and capable of optionally making reversed magnetic domains, to thereby enable recording and reproduction of information by the magneto-optical effect. For example, amorphous alloys of rare-earth and transition metal systems including TbFeCo, GdFeCo, GdTbFe, GdTbFeCo, GdDyFeCo, TbDyFeCo, GdTbDyFeCo, NdDyFeCo, NdDyTbFeCo, NdFe, PrFe, CeFe, etc.; Garnet, CoCr, Ba-ferrite, etc. Among them, TbFeCo, GdFeCo, GdTbFeCo, GdDyFeCo, NdDyFeCo and NdDyTbFeCo are preferred, and TbFeCo and NdDyTbFeCo are most preferred.

The Curie temperature of the magneto-optical recording layer may be controlled by selecting the magneto-optical recording material, and particularly, controlling the composition of the alloy thereof. For example, by decreasing the content of Co, the Curie temperature of most rare-earth and transition metal alloys can be lowered.

The material of the metal reflecting layer is not limited as long as $d \geq 60$ nm and $2.5\ \mu W/K \leq \lambda d \leq 20\ \mu W/K$ are satisfied. Practically, when a metal having $5\ W/(m.K) \leq \lambda \leq 100\ W/(m.K)$ is used, $80\ nm \leq d \leq 300\ nm$ is preferable and when a metal having $100\ W/(m.K) \leq \lambda \leq 200\ W/(m.K)$ is used, $60\ nm \leq d \leq 200$ nm is preferable.

In the present invention, if the magneto-optical recording layer has a relatively high Curie temperature, it is impossible to use a metal reflecting layer having a high $\lambda d$ value, to obtain a sensitivity equivalent to the medium used in the experiment, or higher than that, considering use at a higher rotation speed. Therefore, it was found from experiments that it is generally necessary to satisfy $Tc \leq -10 \times \lambda d + 300$, and for a more sensitive magneto-optical recording medium, preferably $Tc \leq -10 \times \lambda d + 240$. (FIG. 3, made from the results of Examples and Comparative examples, shows that the recording power Pw at which the C/N reached the maximum value varies in relation to the decline of lines such as the lines of $Tc = -10 \times \lambda d + 300$ and $Tc = -10 \times \lambda d + 240$)

To improve the C/N of a medium, the refractive index n and extinction coefficient k of the metal reflecting layer should satisfy $n \leq 3.5$ and $k \geq 3.5$, preferably $n \leq 2.5$ and $4.5 \leq k \leq 8.5$, to a light having a wavelength of 830 nm. Typical materials satisfying the above conditions are Al and Ag, but these materials have a low corrosion resistance. As materials in which the above drawback is eliminated, AlAu and AgAu alloys can be mentioned. The effect of improving the corrosion resistance appears at 0.5 atom % or more of Au content, but if the content of Au is more than 20 atom %, the reflectivity of the AlAu and AgAu alloys is lowered to thus lower the C/N of the medium. Preferably, the content of Au in the alloys is 0.5 to 20 atom %. Further, more preferably the content of Au is 0.5 to 15 atom %, particularly 0.5 to 10 atom %, to thereby reduce the lowering of the reflectivity from that of the Al or Ag alone by not more than 2%.

To lower the cost of the target or medium, it is preferable to reduce the Au content. To reduce the Au content, it is effective to supplementally add to the alloys at least one of the metals of Ti, Zr, Hf, V, Nb, Ta, Cr, Mo, W, Tc, Re, Ru, Os, Ir, Pt and Pd, preferably Ti, Zr, Nb, Ta, Cr and Re. The added amount of these metals should be up to 5 atom %, in order not to lower the reflectivity of the reflecting layer. If the content of these added metal is up to 5 atom %, the lowering of the reflectance of a light having a wavelength of 830 nm, that of a semiconductor laser used for a magneto-optical recording and reproduction unit, can be less than 2%. If the content of the added metals is less than 0.3 atom %, the lowering of the corrosion resistance by reducing the Au content cannot be complemented. The content of the supplemental metals should be 0.5 to 10 atom %. By adding such a metal and containing 0.5 to 10 atom % Au, a metal reflecting layer of AlAu or AgAu alloy has a reflectance lowered by only less than 2% in comparison with an Al or Ag single metal layer, and satisfies the thermal conduction characteristics, optical characteristics and corrosion resistance described before.

It is preferred to have a first transparent dielectric layer between the substrate and the magneto-optical recording layer to obtain an enhancement of the Kerr effect. Such a transparent dielectric layer is preferably silicon nitride or aluminum silicon nitride because they are durable at high temperature and high humidity. The thickness of the first transparent dielectric layer depends on the thickness of a transparent dielectric layer between the magneto-optical recording layer and the metal reflecting layer, but is preferably 30 to 160 nm.

The stack structure of the magneto-optical recording medium of the present invention is not limited except that the metal reflecting layer is formed behind the magneto-optical recording layer or on the opposite side of the light-incident surface. For example, the metal reflecting layer may be formed on the magneto-optical recording layer directly or with a transparent dielectric layer between the metal reflecting layer and the magneto-optical recording layer. An inorganic protecting layer such as a transparent dielectric layer and/or an organic protecting layer such as an optically curable resin layer may be formed on the metal reflecting layer. The most preferred basic construction is a substrate / a first transparent dieletric layer / a magneto-optical recording layer / a second transparent dielectric layer / a metal reflecting layer.

The material of the substrate may be polymer resins such as polycarbonate resin, acrylic resin, epoxy resin, 2-methylpentene resin or copolymers thereof, or glass, etc. Among them, polycarbonate resin is most preferable from the viewpoint of mechanical strength, stability, heat resistance and low moisture permeability.

The organic protecting layer may be optically curing and/or thermosetting resins or a thermoplastic resin and may be formed by spin coating, etc. The protecting layer preferably covers not only the metal reflecting layer but also the side of at least the magneto-optical recording layer.

The transparent dielectric layer is preferably made of a material having a refractive index of more than 1.8, more preferably more than 2.0, to improve the enhancement of the Kerr effect. Examples of such materials include AlN, $MgF_2$, ZnS, $CeF_3$, $Si_3N_4$, AlSiN, SiO, $SiO_2$, $Zr_2O_3$, $In_2O_3$, $SnO_2$, $Ta_2O_5$, AlON, SiON, ZrON, INON, SnON, TaON and mixtures thereof, with AlSiN, ZnS, $Zr_2O_3$, $Ta_2O_5$, ZrON and TaON being preferred because of a refractive index of more than 2.0 as well as a resistance to moisture permeation, a gas barrier characteristic, a corrosion resistance, etc.

The thickness of the second transparent dielectric layer is preferably 15 to 40 nm, more preferably 20 to 35, from the viewpoints of the reflectivity and the C/N of a medium.

The methods of making inorganic layers of the transparent dielectric layer, magneto-optical recording layer and metal reflecting layer may be various thin film forming methods including PVD such as evaporation and sputtering or CVD, but sputtering is preferred because it allows a strong adhesion of the deposited layer to the substrate and prevents a peeling-off of the layer, and thus the medium is more durable.

The medium or disc may have a structure of single-sided, double-sided, etc. and may have any size such as 2 inches, 3.5 inches, etc. The servo system may be a continuous servo, sampled servo, etc.

As described above, the present invention resides in a combination of a metal reflecting layer having a certain heat sink characteristic and a magneto-optical recording layer having a certain Curie temperature and attains a magneto-optical recording medium in which a resistance to repeated recording and erasing and a resistance to continuous erasing are improved, and thus practically reliable.

(1) The thermal conductivity of the metal reflecting layer was determined by the following method:

A quartz substrate, 20×20×1 mm, was mounted in a vacuum chamber of an RF magnetron sputtering unit (ANELVA CORPORATION, SPF-430H type) having three target holders and the chamber was evacuated to 5.3×10$^{-5}$Pa (4×10$^{-7}$Torr).

Then an Ar gas (99.999% purity) was introduced into the vacuum chamber and the flow rate of the Ar gas was controlled to a pressure of 0.67 Pa (5 mTorr). The target was a disc of Al or Ag optionally with a certain number of Au or Ti chips, 5×5×1 mm in size. An RF sputtering was performed at a power of 100 W and a frequency of 13.56 MH$_z$ to deposit an alloy layer having a required composition and a thickness of 100 nm.

The obtained samples were used to measure the thermal conductivity λ[W/(m.K)] of the deposited alloy layer. The measurement of the electric conductivity was performed by the four terminal method and the thermal conductivity λ was calculated from the electric conductivity by the Wiedemann-Franz' law.

As results, pure Al had a thermal conduction coefficient of 140 W/(m.K), AlTi (98:2) 80 W/(m.K), AlAuTi (91:7:2) 20 W/(m.K), AgTi (98:2) 150 W/(m.K), and AgAuTi (93:5:2) 51 W/(m.K), wherein the ratios in the parentheses are a ratio of the constituent elements of the alloy in atom % (the same in the followings).

(2) The Curie temperature of the magneto-optical recording layer was determined by the following method:

A slide glass, 26×76×1 mm in size, was used as the substrate and was mounted in the same unit used for the above-mentioned determination of the thermal conductivity and the pressure in the vacuum chamber was made at 5.3×10$^{-5}$Pa (4×7$^{-7}$Torr).

The target used was a disc of sintered AlSi (50:50), 100 mm diameter and 5 mm thickness, and Ar/$N_2$ mixture gas ($N_2$ 30 vol %) was introduced into the vaccum chamber and controlled in its flow rate to a pressure of 0.40 Pa (3 mTorr). An RF sputtering was performed at a power of 400 W and an RF frequency of 13.56 MHz to deposit an AlSiN having a thickness of 110 nm as the first transparent dielectric layer.

Then a target of either NdDyTbFeCo (6.9:17.4:5.7:60.0:10.0) alloy, TbFeCo (22:68:10) alloy or TbFeCo (22:71:7) alloy was used and RF sputtering was performed at a power of 100 W and a frequency of 13.56 MHz to deposit a magneto-optical recording layer of each of the above alloys 20 nm thick on the first AlSiN layer.

Next, the target and gas were changed to the original sintered AlSi target and Ar/$N_2$ mixture gas ($N_2$ 30 vol %), and an RF sputtering was performed under the same conditions as for the above first transparent dielectric layer to form a second transparent dielectric layer 25 nm thick.

Thus, three samples were made of slide glass / AlSin / NdDyTbFeCo (6.9:17.4:5.7:60.0:10.0), TbFeCo (22:68:10) or TbFeCo (22:71:7) / AlSiN.

The Curie temperature Tc of each alloy layer was determined by the vibrating sample magnetometer (VSM).

As a result, NdDyTbFeCo (6.9:17.4:5.7: 60.0:10.0) had a Tc of 150° C., TbFeCo (22:68:10) had a Tc of 210° C., and TbFeCo (22:71:7) had a Tc of 190° C.

EXAMPLES

Examples 1 and 2

Magneto-optical recording mediums having the construction shown in FIG. 1 were manufactured in the following manner. In FIG. 1, 1 denotes a substrate, 2 a first transparent dielectric layer, 3 a magneto-optical recording layer, 4 a second transparent dielectric layer, 5 a metal reflecting layer, and 6 an organic protecting layer.

A polycarbonate (PC) resin disc-like substrate 1 having a diameter of 130 mm and a thickness of 1.2 mm and having grooves at a pitch of 1.6 μm was mounted in a vacuum chamber of an RF magnetron sputtering unit (ANELVA Corporation SPF-430H) capable of mounting three targets, and the chamber was evacuated to less than 5.3×10$^{-5}$Pa (4×10$^{-7}$Torr).

The PC substrate 1 was rotated at 15 rpm during the following depositions.

A mixture gas of Ar and $N_2$ (Ar:$N_2$=70:30 by volume) was introduced into the chamber and the flow rate of the gas mixture was regulated to a pressure of 0.4 Pa (3 mTorr). An AlSiN layer, 110 nm thick, as the first transparent dielectric layer 2 was deposited by RF sputtering, using a target of a sintered AlSi (50:50), a diameter of 100 mm and a thickness of 5 mm, and an electrical discharge at a power of 400 W and an RF of 13.56 MHz.

Then a TbFeCo alloy layer as the magneto-optical recording layer 3 was deposited on the AlSiN layer 2 by DC sputtering a TbFeCo (22:71:7) alloy target, a diameter of 100 mm and a thickness of 4.5 mm, at a pure 99.999% Ar gas pressure of 0.67 Pa (5 mTorr) and an electric discharge power of 100 W. The deposited TbFeCo alloy layer had a thickness of 20 nm and a Curie temperature of 190° C.

Then by changing the target to AlSi and the gas to a mixture gas of Ar and $N_2$ (Ar:$N_2$=7:30 by volume), another AlSiN layer was deposited under the same conditions as above to form the second transparent dielectric nitride layer 4, 25 nm thick.

Then, the target was changed to a disc of Ag or Al, 100 mm diameter and 5 mm thick, with a certain number of Ti chips, 5×5×1 mm, and the gas was changed to a pure 99.999% Ar gas. RF sputtering was carried out under the same electric discharge conditions as for the recording layer 3, to deposit, as the metal reflecting layer 5, an AlAu (98:2) layer having a thickness of 80 nm and a λd of 6.4 µW/K (Example 1) or an AgTi (98:2) layer having a thickness of 60 nm and a λd of 9.0 µW/K (Example 2).

Then, on the metal reflecting layer 5, an ultra-violet ray curable phenolic novolak epoxy acrylate resin was coated by a spin coater, which was then cured by irradiation with an ultra-violet ray and an organic protecting layer 6, about 20 µm thick, was formed.

Examples 3 and 4

Examples 1 and 2 were repeated and magneto-optical recording discs were made, except that as the metal reflecting layer 5 an AlAuTi (91:7:2) layer (Example 3) or an AgAuTi (93:5:2) layer (Example 4) was deposited using a target of an Al or Ag disc with Au and Ti chips (5×5×1 mm) thereon and a pure 99.999% Ar gas by RF sputtering at a pressure of 0.67 Pa (5 mTorr), a power of 100 W and a frequency of 13.56 MHz. The samples had a λd of 3.0 µW/K (Example 3) and a λd of 5.1 µW/K (Example 4).

Examples 5 and 6

Samples were made in the same manner as in Examples 1 and 2, except that the recording layer 3 was the above NdDyTbFeCo layer having a Tc of 150° C. and the thicknesses of the metal reflecting layers of AlTi alloy (Example 5) and AgTi alloy (Example 6) were 100 nm and 80 nm respectively.

The magneto-optical recording layer 3 was made using a target of an NdDyTbFeCo (6.9:17.4:5.7:60.0:10.0) alloy disc and a pure 99.999% Ar gas by RF sputtering at a pressure of 0.67 Pa (5 mTorr), a power of 100 W and a frequency of 13.56 MHz. The deposited layer was NdDyTbFeCo alloy layer having a thickness of 20 nm.

To form a metal reflecting layer 5, using a disc of Ag or Al, 100 mm diameter and 5 mm thick, with a certain number of Ti chips, 5×5×1 mm, thereon as a target and a pure 99.999% Ar gas, RF sputtering was carried out under the same electric discharge conditions as for the recording layer 3, to deposit an AlTi (98:2) layer having a thickness of 100 nm and a λd of 8.0 µW/K (Example 5) or an AgTi (98:2) layer having a thickness of 80 nm and a λd of 12.0 µW/K (Example 6).

Examples 7 and 8

Examples 5 and 6 was repeated and magneto-optical recording discs were made, except that as the metal reflecting layer 5 an AlAuTi (91:7:2) layer 200 nm thick (Example 7) or an AgAuTi (93:5:2) layer 120 nm thick (Example 8) was deposited using a target of an Al or Ag disc (100 mm diameter and 5 mm thickness) with Au and Ti chips (5×5×1 mm) thereon and a pure 99.999% Ar gas by RF sputtering at a pressure of 0.67 Pa (5 mTorr), a power of 100 W and a frequency of 13.56 MHz. The samples of the magneto-optical recording mediums as shown in FIG. 1 had a λd of 4.0 µW/K (Example 7) and a λd of 6.1 µW/K (Example 8).

Examples 9 and 10

Figure 2:
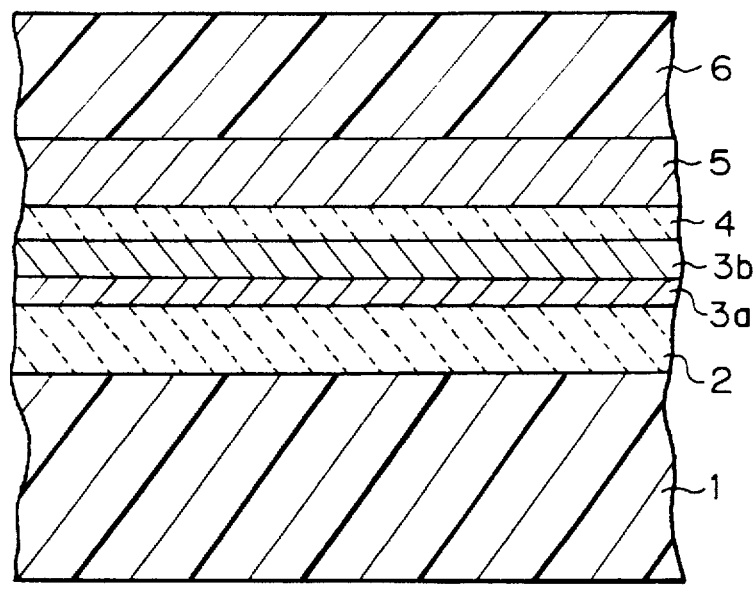

Examples 7 and 8 was repeated and magneto-optical recording discs as shown in FIG. 2 were made, except that the magneto-optical recording layer was replaced by two exchange coupled magnetic layers 3a and 3b.

The first magnetic layer 3a closer to the PC substrate was deposited by using a target of an GdFeCo (21:55:24) alloy disc and a pure 99.999% Ar gas by RF sputtering at a pressure of 0.67 Pa (5 mTorr), a power of 100 W and a frequency of 13.56 MHz. The deposited GdFeCo layer had a thickness of 12.5 nm.

The second magnetic layer 3b exchange coupled with the first magnetic layer 3a was deposited by using a target of an NdDyTbFeCo (6.9:17.4:5.7:60.0:10.0) alloy disc and a pure 99.999% Ar gas by RF sputtering at a pressure of 0.67 Pa (5 mTorr), a power of 100 W and a frequency of 13.56 MHz. Deposited was a NdDyTbFeCo alloy layer having a Curie temperature of 150° C. and a thickness of 17.5 nm.

The first and second magnetic layers 3a and 3b were deposited as above and samples as shown in FIG. 2 were made in which the metal reflecting layer 5 was an AlAuTi layer having a λd of 4.0 µW/K (Example 9) and an AgAuTi layer having a λd of 6.1 µW/K (Example 10).

Comparative examples 1 and 2

Examples 1 and 2 were repeated to make magneto-optical recording mediums as shown in FIG. 1, except that the magneto-optical recording layer 3 was changed to a TbFeCo (22:68:10) alloy layer having a Tc of 210° C. and the metal reflecting layer was changed to an AlTi (98:2) having a thickness of 40 nm (Comparative example 1) and an AgTi (98:2) having a thickness of 30 nm (Comparative example 2).

The magneto-optical recording layer 3 was made by using a target of a TbFeCo (22:68:10) alloy disc and a pure 99.999% Ar gas and RF sputtering at a pressure of 0.67 Pa (5 mTorr), a power of 100 W and a frequency of 13.56 MHz. The deposited layer was TbFeCo alloy layer having a Tc of 210° C. and a thickness of 20 nm.

Comparative example 3

Example 1 was repeated to make a magneto-optical recording medium as shown in FIG. 1, except that the metal reflecting layer was changed to an AgAuTi (93:5:2) having a thickness of 60 nm.

Comparative example 4

Example 3 was repeated to make a magneto-optical recording medium as shown in FIG. 1, except that the magneto-optical recording layer 3 was changed to a TbFeCo alloy layer having a Tc of 190° C. and a thickness of 20 nm by using a target of a TbFeCo (22:71:7) alloy disc and a pure 99.999% Ar gas and Rf sputtering at a pressure of 0.67 Pa (5 mTorr), a power of 100 W and a frequency of 13.56 MHz, and that the metal reflecting layer 5 was changed to an AlAuTi (91:7:2) having a thickness of 60 nm. The magneto-optical recording medium had a λd of 1.2 µW/K.

Comparative examples 5 and 6

Examples 2 and 6 were repeated to make magneto-optical recording mediums as shown in FIG. 1, except that the metal reflecting layer was changed to an Al layer having a thickness of 120 nm by using a target of an Al disc (100 mm diameter and 5 mm thick) and a pure 99.999% Ar gas and RF sputtering at a pressure of 0.67 Pa (5 mTorr), a power of 100 W and a frequency of 13.56 MHz. The metal reflecting layer 5 had a λd of 16.8 μW/K and a magneto-optical recording layer was made of TbFeCo having a Tc of about 190° C. (Comparative example 5) or NdDyTbFeCo having a Tc of about 150° C. (Comparative example 6).

Evaluations

The samples obtained as above were evaluated as below:

First, the dependency of the C/N of the samples on the recording power was determined. The determination was made using a magneto-optical recording and reproduction unit (Pulstec Industry, DDU-1000 type) and measuring the C/N of a sample on a track of 30 mm radius under the conditions of a disc rotation speed of 1800 rpm, a frequency of 3.7 MHz, an external magnetic field of 24 kA/m (300 Oe) and a reproduction power of 1.5 W, while varying the recording power. A recording power Pw and a C/N when the C/N reached the maximum value were obtained.

Next, a continuous erasing stability test was made on the same track as that used for the initial C/N measurement. The erasing was performed on the identical track at a disc rotation speed of 1800 rpm and an erasing power of 8.0 to 9.0 mW depending on the recording sensitivity for a certain number of rotations, followed by measuring the C/N of the track under the same conditions as those for the initial C/N measurement while using a recording power by which the maximum C/N was obtained in the initial C/N measurement.

Further, after observing the layer surface of each sample and confirming that there was no defect such as pin holes, an environmental test was made at 80° C. and 85% RH for 2000 hours and the number of pin holes formed on the layer surface was counted by the naked eye.

Results

In Example 1, the recording power Pw at which the initial C/N reached the maximum was 5.5 mW, the C/N at that time was 48.5 dB, the C/N after erasing $10^7$ rotations was 45.5 dB. The number of pin holes formed after the environmental test was about 10.

In Example 2, the recording power Pw at which the initial C/N reached the maximum was 5.5 mW, the C/N at that time was 49.0 dB, the C/N after erasing $10^7$ rotations was 46.0 dB. The number of pin holes formed after the environmental test was about 20.

In Example 3, the recording power Pw at which the initial C/N reached the maximum was 5.0 mW, the C/N at that time was 49.5 dB, the C/N after erasing $10^7$ rotations was 46.5 dB. Pin holes were not found after the environmental test.

In Example 4, the recording power Pw at which the initial C/N reached the maximum was 5.5 mW, the C/N at that time was 50.0 dB, the C/N after erasing $10^7$ rotations was 47.0 dB. Pin holes were not found after the environmental test.

In Example 5, the recording power Pw at which the initial C/N reached the maximum was 5.0 mW, the C/N at that time was 47.0 dB, the C/N after erasing $10^6$ rotations was 46.5 dB, the C/N after erasing $10^7$ rotations was 45.5 dB. The number of pin holes formed after the environmental test was about 10.

In Example 6, the recording power Pw at which the initial C/N reached the maximum was 5.5 mW, the C/N at that time was 48.0 dB, the C/N after erasing $10^6$ rotations was 47.5 dB, the C/N after erasing $10^7$ rotations was 47.0 dB. The number of pin holes formed after the environmental test was about 20.

In Example 7, the recording power Pw at which the initial C/N reached the maximum was 4.5 mW, the C/N at that time was 48.0 dB, the C/N after erasing $10^6$ rotations was 47.5 dB, the C/N after erasing $10^7$ rotations was 46.5 dB. Pin holes were not found after the environmental test.

In Example 8, the recording power Pw at which the initial C/N reached the maximum was 5.0 mW, the C/N at that time was 49.0 dB, the C/N after erasing $10^6$ rotations was 48.5 dB, the C/N after erasing $10^7$ rotations was 47.0 dB. Pin holes were not found after the environmental test.

In Example 9, the recording power Pw at which the initial C/N reached the maximum was 5.0 mW, the C/N at that time was 48.5 dB, the C/N after erasing $10^6$ rotations was 48.0 dB, the C/N after erasing $10^7$ rotations was 47.0 dB. Pin holes were not found after the environmental test.

In Example 10, the recording power Pw at which the initial C/N reached the maximum was 5.5 mW, the C/N at that time was 49.5 dB, the C/N after erasing $10^6$ rotations was 49.0 dB, the C/N after erasing $10^7$ rotations was 48.0 dB. Pin holes were not found after the environmental test.

On the contrast, in Comparative example 1, the recording power Pw at which the initial C/N reached the maximum was 5.5 mW, the C/N at that time was 48.0 dB, the C/N after erasing $10^7$ rotations was 40.0 dB. The number of pin holes formed after the environmental test was about 10.

In Comparative example 2, the recording power Pw at which the initial C/N reached the maximum was 5.5 mW, the C/N at that time was 49.0 dB, the C/N after erasing $10^7$ rotations was 41.0 dB. The number of pin holes formed after the environmental test was 20.

In Comparative example 3, the recording power Pw at which the initial C/N reached the maximum was 5.5 mW, the C/N at that time was 48.0 dB, the C/N after erasing $10^6$ rotations was 43.0 dB, the C/N after erasing $10^7$ rotations was 38.0 dB. Pin holes were not found after the environmental test.

In. Comparative example 4, the recording power Pw at which the initial C/N reached the maximum was 5.0 mW, the C/N at that time was 48.0 dB, the C/N after erasing $10^6$ rotations was 45.0 dB, the C/N after erasing $10^7$ rotations was 43.0 dB. Pin holes were not found after the environmental test.

In Comparative examples 5 and 6, the recording power Pw at which the initial C/N reached the maximum was 6.0 mW, the C/N at that time was 46.5 dB (Comparative example 5) or 46.0 dB (Comparative example 6). These indicate that the recording sensitivity does not satisfy the purpose of the present invention, and therefore, the continuous erasing test was not carried out. The number of pin holes formed after the environmental test was several hundreds.

Figure 3:
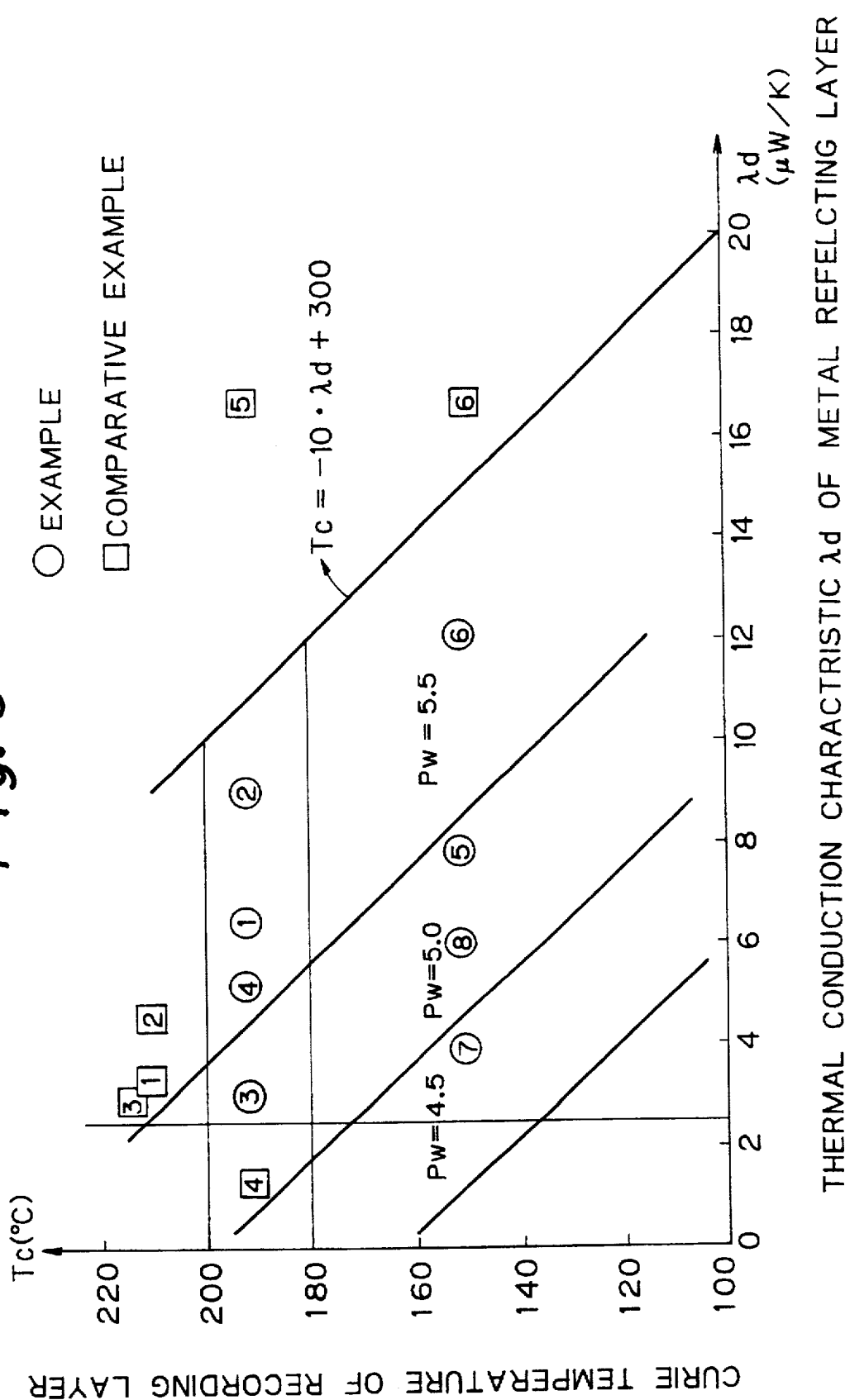
FIG. 3 shows the results of the Examples and Comparative examples.

These results are summarized in Table and FIG. 3.

In FIG. 3, if the Curie temperature of the magneto-optical recording layer is above 200° C. (Comparative examples 1 to 3) and the λd of the metal reflecting layer is made lower, the C/N of the medium after $10^7$ rotations is disadvantageously lowered. The Curie temperature of the magneto-optical recording layer should not be less than 100° C., because the high temperature and high humidity test is performed at 80° C. and 85% RH. If the λd of the metal reflecting layer is less than 2.5, even if the Curie temperature of the magneto-optical recording layer is lower than 200° C. (Comparative example 4), the C/N of the medium after $10^7$ rotations is disadvantageously lowered. If the λd of the metal reflecting layer is more than 16 (Comparative examples 4 and 5), the initial C/N of the medium is disadvantageously low. Also, it is found that if the relationship between the Tc and the λd does not satisfy Tc≦−10·λd+300, a disadvantageously high recording power, more than 5.5 mW, is required. If the relationship of Tc≦−10·λd+240 is satisfied, a recording power of 5.0 mW or less can be used (Examples 3, 5, 7 and 8). If the Curie temperature of the magneto-optical recording layer is lower than 180° C. or further lower than 160° C. (Examples 5 to 8), the C/N of the medium after $10^7$ rotations is above 45 dB and a lowering of the C/N from the initial C/N is advantageously low.

and AgAu alloys containing at least one element selected from the group consisting of Ti, Zr, Hf, V, Nb, Ta, Cr, Mo, W, Tc, Re, Ru, Os, Ir, Pt and Pd.

7. A magneto-optical recording medium according to claim 1, further comprising a second dielectric layer between said magneto-optical recording layer and said metal reflecting layer.

8. A magneto-optical recording medium according to claim 7, wherein said second dielectric layer has a layer thickness of from 15 nm to 40 nm.

TABLE

| | Magneto-optical recording layer (thickness: nm) | Tc (°C.) | Metal reflecting layer (thickness: nm) | λ (W/m · K) | λd (μW/K) | C/N max Pw (mW) | Initial C/N (dB) | Erasing power (mW) | C/N (dB) after $10^6$ rotations | C/N (dB) after $10^7$ rotations | Number of Pin Holes |
|---|---|---|---|---|---|---|---|---|---|---|---|
| Ex. 1 | TbFeco (20) | 190 | AlTi (80) | 80 | 6.4 | 5.5 | 48.5 | 9.0 | — | 45.5 | about 10 |
| Ex. 2 | | | AgTi (60) | 150 | 9.0 | 5.5 | 49.0 | 9.0 | — | 46.0 | about 20 |
| Ex. 3 | | | AlAuTi (150) | 20 | 3.0 | 5.0 | 49.5 | 8.5 | — | 46.5 | 0 |
| Ex. 4 | | | AgAuTi (100) | 51 | 5.1 | 5.5 | 50.0 | 9.0 | — | 47.0 | 0 |
| Ex. 5 | NdDyTbFeCo | 150 | AlTi (100) | 80 | 8.0 | 5.0 | 47.0 | 8.5 | 46.5 | 45.5 | about 10 |
| Ex. 6 | (20) | | AgTi (80) | 150 | 12.0 | 5.5 | 48.0 | 9.0 | 47.5 | 47.0 | about 20 |
| Ex. 7 | | | AlAuTi (200) | 20 | 4.0 | 4.5 | 48.0 | 8.0 | 47.5 | 46.5 | 0 |
| Ex. 8 | | | AgAuTi (120) | 51 | 6.1 | 5.0 | 49.0 | 8.5 | 48.5 | 47.0 | 0 |
| Ex. 9 | First layer: GdFeCo (12.5) | 150 (Tc2) | AlAuTi (200) | 20 | 4.0 | 5.0 | 48.5 | 8.5 | 48.0 | 47.0 | 0 |
| Ex. 10 | Second layer: NdDyTbFeCo (17.5) | | AgAuTi (120) | 51 | 6.1 | 5.5 | 49.5 | 9.0 | 49.0 | 48.0 | 0 |
| Com. Ex. 1 | TbFeCo (20) | 210 | AlTi (40) | 80 | 3.2 | 5.5 | 48.0 | 9.0 | — | 40.0 | about 10 |
| Com. Ex. 2 | | | AgTi (30) | 150 | 4.5 | 5.5 | 49.0 | 9.0 | — | 41.0 | about 20 |
| Com. Ex. 3 | | | AgAuTi (50) | 51 | 3.1 | 5.5 | 48.0 | 9.0 | 43.0 | 38.0 | 0 |
| Com. Ex. 4 | TbFeCo (20) | 190 | AlAuTi (60) | 20 | 1.2 | 5.0 | 48.0 | 8.5 | 45.0 | 43.0 | 0 |
| Com. Ex. 5 | TbFeCo (20) | 190 | Al (120) | 140 | 16.8 | 6.0 | 46.5 | — | — | — | several 100s |
| Com. Ex. 6 | NdDyTbFeCo (20) | 150 | Al (120) | 140 | 16.8 | 6.0 | 46.0 | — | — | — | several 100s |

We claim:

1. A magneto-optical recording medium comprising a transparent substrate, a first dielectric layer on the substrate, a magneto-optical recording layer on the first dielectric layer and a metal reflecting layer on the magneto-optical recording layer, wherein said magneto-optical recording layer has a Curie temperature Tc of from 100° C. to 200° C. and a layer thickness of from 15 nm to 60 nm, said metal reflecting layer has a layer thickness of not less than 60 nm and a product λd of a thermal conductivity λ by the layer thickness d of from 2.5 μW/K to 20 μW/K, and the following formula is satisfied: 10·λd+160≦Tc≦−10·λd+240.

2. A magneto-optical recording medium according to claim 1, wherein said magneto-optical recording layer has a Curie temperature of from 100° C. to 180° C.

3. A magneto-optical recording medium according to claim 2, wherein said magneto-optical recording layer has a Curie temperature of from 100° C. to 160° C.

4. A magneto-optical recording medium according to claim 1, wherein said magneto-optical recording layer comprises rare-earth and transition metal elements.

5. A magneto-optical recording medium according to claim 1, wherein said metal reflecting layer is an alloy containing at least one of AlAu and AgAu.

6. A magneto-optical recording medium according to claim 1, wherein said metal reflecting layer is one of AlAu 9. A magneto-optical recording medium according to claim 8, wherein said second dielectric layer has a layer thickness of from 20 nm to 35 nm.

10. A magneto-optical recording medium according to claim 7, wherein said second dielectric layer is one of AlSiN and TaON.

11. A magneto-optical recording medium comprising a transparent substrate, a first dielectric layer on the substrate, a magneto-optical recording layer on the first dielectric layer and a metal reflecting layer on the magneto-optical recording layer, wherein said magneto-optical recording layer comprises first and second magnetic layers, the second magnetic layer being located on the side of metal reflecting layer, said first magnetic layer has a Curie temperature higher than that of said second magnetic layer, a coercive force at a room temperature lower than that of said second magnetic layer and a layer thickness thinner than that of said second magnetic layer, said second magnetic layer has a Curie temperature $Tc_2$ of from 100° C. to 180° C., said magneto-optical recording layer has a total layer thickness of from 15 nm to 60 nm, said metal reflecting layer has a layer thickness of not less than 60 nm and a product λd of a thermal conductivity by the layer thickness of from 2.5 μW/K to 20 μW/K, and the following formula is satisfied: 10·λd+160≦$Tc_2$≦−10·λd+240.

12. A magneto-optical recording medium according to claim 11, wherein said second magnetic layer has a Curie temperature of from 100° C. to 160° C.

13. A magneto-optical recording medium according to claim 11, wherein said first and second magnetic layers comprise rare-earth and transition metal elements.

14. A magneto-optical recording medium according to claim 11, wherein said metal reflecting layer is an alloy containing at least one of AlAu and AgAu.

15. A magneto-optical recording medium according to claim 11, wherein said metal reflecting layer is one AlAu and AgAu alloys containing at least one element selected from the group consisting of Ti, Zr, Hf, V, Nb, Ta, Cr, Mo, W, Tc, Re, Ru, Os, Ir, Pt and Pd.

16. A magneto-optical recording medium according to claim 11, further comprising a second dielectric layer between said magneto-optical recording layer and said metal reflecting layer.

17. A magneto-optical recording medium according to claim 16, wherein said second dielectric layer has a layer thickness of from 15 nm to 40 nm.

18. A magneto-optical recording medium according to claim 17, wherein said second dielectric layer has a layer thickness of from 20 nm to 35 nm.

19. A magneto-optical recording medium according to claim 16, wherein said second dielectric layer is one of AlSiN and TaON.

20. A process for recording and storing information on a magneto-optical recording medium whereby stored information can be repeatedly erased and new information recorded while maintaining a high recording sensitivity and excellent resistance to repeated recording and erasing, which process comprises recording the information on a magneto-optical recording medium comprising a transparent substrate, a first dielectric layer on the substrate, a magneto-optical recording layer on the first dielectric layer and a metal reflecting layer on the magneto-optical recording layer, wherein said magneto-optical recording layer has a Curie temperature Tc of from 110° C. to 180° and a layer thickness of from 15 nm to 60 nm, said metal reflecting layer has a layer thickness of not less than 60 nm and a product $\lambda d$ of a thermal conductivity $\lambda$ by the layer thickness d of from 2.5 μW/K to 20 μW/K, and the following formula is satisfied:

$$-10 \times \lambda d + 160 \leq Tc \leq \lambda d + 240.$$

21. A process for recording and storing information on a magneto-optical recording medium whereby stored information can be repeatedly erased and new information recorded while maintaining a high recording sensitivity and excellent resistance to repeated recording and erasing, which process comprises recording the information on a magneto-optical recording medium comprising a transparent substrate, a first dielectric layer on the substrate, a magneto-optical recording layer on the first dielectric layer and a metal reflecting layer on the magneto-optical recording layer, wherein said magneto-optical recording layer comprises first and second magnetic layers, the second magnetic layer being located on the side of metal reflecting layer, said first magnetic layer has a Curie temperature higher than that of said second magnetic layer, a coercive force at a room temperature lower than that of said second magnetic layer and a layer thickness thinner than that of said second magnetic layer, said second magnetic layer has a Curie temperature $Tc_2$ of from 110° C. to 180° C., said magneto-optical recording layer has a total layer thickness of from 15 nm to 60 nm, said metal reflecting layer has a layer thickness of not less than 60 nm and a product $\lambda d$ of a thermal conductivity by the layer thickness of from 2.5 μW/K to 20 μW/K, and the following formula is satisfied:

$$-10 \times \lambda D + 160 \leq Tc_3 \leq \lambda d + 240.$$

* * * * *